A. Randel,
Oil Press.
No. 1.324. Reissued July 22 1862
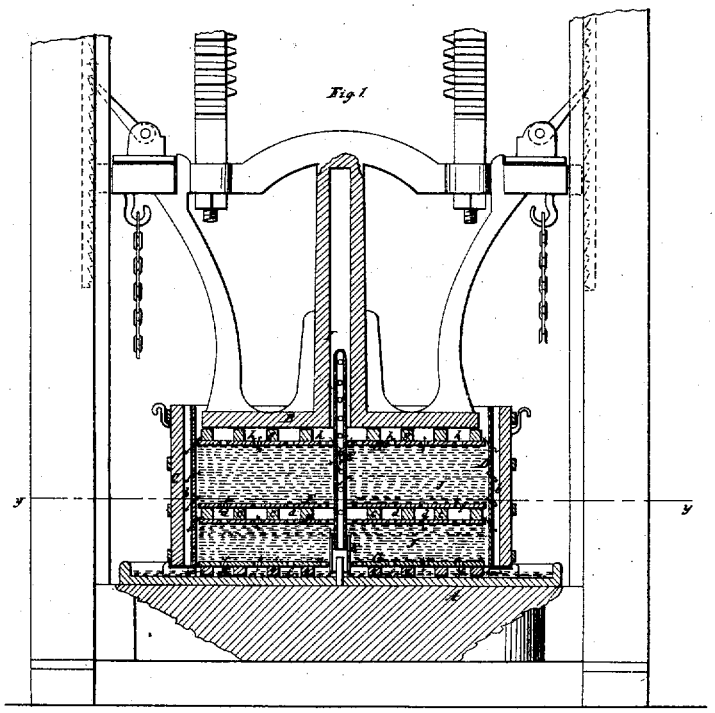
Fig. 2.
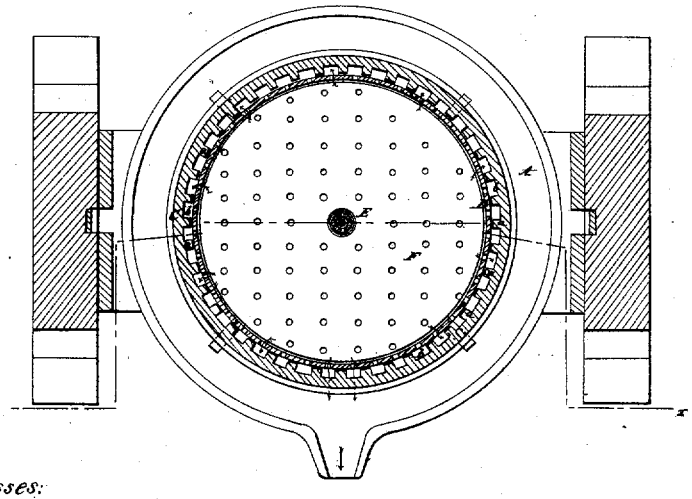
Witnesses:
Wm. A. Crommell
Cm Livingston
Inventor:
A. Randel
THE HELIOTYPE PRINTING CO. 220 DEVONSHIRE ST. BOSTON.

UNITED STATES PATENT OFFICE.

JOHN J. ECKEL, OF NEW YORK, N. Y., ASSIGNEE OF A. RANDEL.

IMPROVED OIL-PRESS.

Specification forming part of Letters Patent No. 34,722, dated March 18, 1862; Reissue No. 1,324, dated July 22, 1862.

*To all whom it may concern:*

Be it known that I, JOHN J. ECKEL, of the city, county, and State of New York, do hereby declare that A. RANDEL, of the same city, county, and State, did invent a new and useful Improvement in Presses for Expressing Oil, Tallow, and other Grease from the Substances which Contain Them, for which Letters Patent, bearing date March 18, 1862, were granted, and by virtue of an assignment, duly executed issued to me; and, for the purpose of obtaining a reissue, I do hereby declare that the following is a full, clear, and exact description of the same, reference being had to the accompanying drawings, making a part of this specification, in which—

Figure 1 is a vertical central section of my invention, taken in the line *x x*, Fig. 2. Fig. 2 is a horizontal section of the same, taken in the line *y y*, Fig. 1.

Similar letters of reference indicate corresponding parts in the two figures.

The object of this invention is to afford a more ready means than has been hitherto provided for the exit or escape of the oil or other grease from the substance under compression, and thereby not only effect a saving in power, but also cause the work to be performed in a much more thorough manner than usual.

The invention consists in combining a perforated and a solid curb or press-box with perforated horizontal plates and a perforated central discharge-tube, all constructed and arranged as hereinafter described to effect the desired result.

To enable those skilled in the art to fully understand and construct my invention, I will proceed to describe it.

A represents the bed of a press, and B the plunger or follower, which may be operated by any proper means. C is a cast-metal curb or hollow cylinder, which is placed in the bed A, and is provided with vertical ribs *a* at its inner side. These ribs are at equal distances apart, and may be cast with the curb or cylinder all in one piece. C′ are wrought-iron hoops or bands shrunk upon the outside of the cylinder C to give it additional strength. D is a perforated cylinder, which may be of rolled sheet metal of a suitable thickness. This perforated cylinder D is fitted within the curb or cylinder C, and is in contact with its sides *a*, the spaces *b* between the ribs serving as channels for the escape of the oil or grease, as will be presently shown.

E is a vertical perforated tube, which is placed centrally within the cylinder D, and F F are two perforated plates, which are secured to parallel bars *c*, the spaces *d* between said bars also serving as channels for the escape of oil or grease, the plates F F being placed horizontally within the perforated cylinder D, and at about the center of the substance to be compressed. (See Fig. 1.)

G is a perforated plate, which is placed horizontally at the bottom of cylinder D, said plate resting on the bed A, or, rather, its bars *e* resting on the bed, which bars are attached to the under side of the plate G, the spaces, *f*, between the bars *e*, forming escape-passages for the oil or grease. A similar perforated plate, H, is placed on the top of the substance to be compressed, the plate H having bars *g* attached to its upper surface, the passages *h* between forming escape-passages for the oil or grease.

E′ is a short vertical tube secured in the center of the plate G, to receive and sustain the lower end of the tube E. The plunger-rod I is hollow to receive the perforated tube E as the plunger descends.

The operation is as follows: The plunger B is elevated above the curb C and perforated cylinder D, and the lower perforated plate, G, is placed within the cylinder D, and a quantity of the substance J to be compressed is placed in the cylinder D, the latter being rather more than half filled. The plates F F are then placed in the cylinder D, the perforated tube E passing through their center, and the cylinder D is then compactly filled with the substance J. The plunger B is then forced down on the substance J and the latter compressed within the cylinder D. As the substance J is compressed the oil and grease escapes through the passages *d* to the central tube, E, and to the perforated cylinder D, a free communication being allowed between the cylinder D and tube E. The passages *f* between the bars *e* of the lower plate, G, and the passages *h* between the upper bars, *g*, afford also a similar communication, and hence the oil or grease has a free escape from the substance J, the

BEST AVAILABLE COPY vertical passage *b* between the ribs *a* affording an escape for the oil or grease at the outer side of cylinder D, the oil or grease that passes into the central tube escaping from its lower end.

The solid cast-metal cylinder or curb C, with strong wrought-iron bands shrunk upon its periphery, is essential in order to support cylinder D under the pressure to which it is subjected internally.

I do not claim separately the central perforated tube E; nor do I claim a perforated cylinder, D, in itself considered; but I do claim as new and desire to secure by Letters Patent—

1. The hollow plunger B I, solid curb C, with a perforated cylinder, D, placed within it, and so arranged as to allow vertical escape-passages between them for the exit of the oil or grease, and the perforated central discharge-tube, E, in combination with the perforated horizontal plates F, G, and H, arranged as shown, or in any convenient way to admit of lateral escape-passages for the oil or grease between the central tube, E, and the perforated cylinder D, as set forth.

2. The bed A, hollow plunger B I, solid ribbed curb C, surrounded by bands C′, shrunk upon its periphery, perforated cylinder D, perforated central discharge-tube, E, supporting-tube, E′, perforated plates F, G, and H, and bars *c e g*, all constructed, combined, and arranged in the manner and for the purposes hereinbefore explained.

JOHN J. ECKEL.

Witnesses:
RICHARDSON GAWLEY,
JAMES LAIRD.